(12) United States Patent
An et al.

(10) Patent No.: US 11,454,928 B2
(45) Date of Patent: Sep. 27, 2022

(54) HOLOGRAPHIC DISPLAY APPARATUS AND METHOD FOR PROVIDING EXPANDED VIEWING WINDOW

(71) Applicant: SAMSUNG ELECTRONICS CO., LTD., Suwon-si (KR)

(72) Inventors: Jungkwuen An, Suwon-si (KR); Hoon Song, Yongin-si (KR); Hongseok Lee, Seoul (KR); Wontaek Seo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 164 days.

(21) Appl. No.: 16/596,914

(22) Filed: Oct. 9, 2019

(65) Prior Publication Data

US 2020/0142355 A1    May 7, 2020

(30) Foreign Application Priority Data

Nov. 6, 2018  (KR) .................. 10-2018-0135333
Jan. 10, 2019 (KR) .................. 10-2019-0003290

(51) Int. Cl.
  *G03H 1/02*   (2006.01)
  *G03H 1/20*   (2006.01)
  *G03H 1/22*   (2006.01)

(52) U.S. Cl.
  CPC ............ *G03H 1/02* (2013.01); *G03H 1/202* (2013.01); *G03H 1/2294* (2013.01); *G03H 2001/0224* (2013.01); *G03H 2001/2242* (2013.01); *G03H 2223/19* (2013.01); *G03H 2226/05* (2013.01); *G03H 2240/61* (2013.01)

(58) Field of Classification Search
  None
  See application file for complete search history.

(56) References Cited

U.S. PATENT DOCUMENTS

| 9,164,481 B2 | 10/2015 | Tsang |
| 2006/0050340 A1 | 3/2006 | Schwerdtner et al. |

(Continued)

FOREIGN PATENT DOCUMENTS

| CN | 105739280 A | 7/2016 |
| JP | 10-232367 A | 9/1998 |

(Continued)

OTHER PUBLICATIONS

Jungkwuen An et al., "Binocular Holographic Display with Pupil Space Division Method", SID Symposium Digest of Technical Papers, vol. 46, No. 1, 2015, pp. 522-525.

(Continued)

*Primary Examiner* — Jennifer D. Carruth
(74) *Attorney, Agent, or Firm* — Sughrue Mion, PLLC

(57) ABSTRACT

Provided is a holographic display apparatus including a light source configured to emit light, a spatial light modulator configured to form a hologram pattern to modulate the light incident thereon and reproduce a hologram image, the spatial light modulator including a plurality of display pixels that are arranged two-dimensionally, and an optical element provided opposite a light incidence surface of the spatial light modulator or a light exit surface of the spatial light modulator, the optical element including an array of a plurality of light transmission patterns that are arranged irregularly.

39 Claims, 15 Drawing Sheets

(56) References Cited

U.S. PATENT DOCUMENTS

| | | | |
|---|---|---|---|
| 2006/0238836 A1 | 10/2006 | Schwerdtner | |
| 2010/0103486 A1 | 4/2010 | Kroll et al. | |
| 2011/0122467 A1 | 5/2011 | Futterer et al. | |
| 2013/0162637 A1* | 6/2013 | Son | G03H 1/2294 |
| | | | 345/419 |
| 2016/0103321 A1 | 4/2016 | An et al. | |
| 2016/0187851 A1 | 6/2016 | Park et al. | |
| 2017/0185037 A1 | 6/2017 | Lee et al. | |
| 2018/0032030 A1 | 2/2018 | Kim et al. | |
| 2018/0188016 A1* | 7/2018 | Cheng | G01B 9/02016 |
| 2018/0292784 A1* | 10/2018 | Nguyen | G02B 21/18 |

FOREIGN PATENT DOCUMENTS

| | | |
|---|---|---|
| JP | 2000-206456 A | 7/2000 |
| KR | 10-2015-0066902 A | 6/2015 |
| KR | 10-2016-0042385 A | 4/2016 |
| KR | 10-1615828 B1 | 4/2016 |
| WO | 2004/031841 A2 | 4/2004 |
| WO | 2019/009722 A2 | 1/2019 |

OTHER PUBLICATIONS

Communication dated Mar. 31, 2020, issued by the European Patent Office in counterpart European Application No. 19204257.0.
Y.T. Kim et al., "Holographic Augmented Reality Head-Up Display with Eye Tracking and Steering Light Source", The 23rd IDW 2016, Dec. 9, 2016, pp. 1308-1311 (4 pages total).
Communication dated Apr. 20, 2022 by the China National Intellectual Property Administration in Chinese Application No. 201910999108.9.

* cited by examiner

HOLOGRAPHIC DISPLAY APPARATUS AND METHOD FOR PROVIDING EXPANDED VIEWING WINDOW

CROSS-REFERENCE TO RELATED APPLICATIONS

This application claims priority from Korean Patent Application No. 10-2018-0135333, filed on Nov. 6, 2018, and Korean Patent Application No. 10-2019-0003290 filed on Jan. 10, 2019, in the Korean Intellectual Property Office, the disclosures of which are incorporated herein in their entireties by reference.

BACKGROUND

1. Field

Example embodiments of the present disclosure relate to holographic display apparatuses and display methods, and more particularly to, holographic display apparatuses capable of providing an expanded viewing window when reproducing a holographic image via an off-axis technique and display methods.

2. Description of the Related Art

Methods such as glasses-type methods and non-glasses-type methods are widely used for realizing three-dimensional (3D) images. Examples of glasses-type methods include deflected glasses-type methods and shutter glasses-type methods, and examples of non-glasses-type methods include lenticular methods and parallax barrier methods. When these methods are used, there is a limit to the number of viewpoints that may be implemented due to binocular parallax. Also, these methods make the viewers feel tired due to the difference between the depth perceived by the brain and the focus of the eyes.

Recently, holographic 3D image display methods, which provide full parallax and are capable of making the depth perceived by the brain consistent with the focus of the eyes, have been gradually put to practical use. According to such a holographic display technique, when light is radiated onto a hologram pattern having recorded thereon an interference pattern obtained by interference between light and object light reflected from an original object, the light is diffracted and an image of the original object is reproduced. When a currently commercialized holographic display technique is used, a computer-generated hologram (CGH), rather than a hologram pattern obtained by directly exposing an original object to light, is provided as an electrical signal to a spatial light modulator. Then, the spatial light modulator forms a hologram pattern and diffracts light according to an input CGH signal, thereby generating a 3D image.

SUMMARY

According to an aspect of an example embodiment, there is provided a holographic display apparatus including a light source configured to emit light, a spatial light modulator configured to form a hologram pattern to modulate the light incident thereon and reproduce a hologram image, the spatial light modulator including a plurality of display pixels that are provided two-dimensionally, and an optical element provided opposite a light incidence surface of the spatial light modulator or a light exit surface of the spatial light modulator, the optical element including an array of a plurality of light transmission patterns that are provided irregularly.

A resolution of the array of the plurality of light transmission patterns may be greater than a resolution of the spatial light modulator.

The holographic display apparatus further including an image processor configured to generate hologram data based on the hologram image to be reproduced at a resolution corresponding to the resolution of the array of the plurality of light transmission patterns, extract the hologram data that is generated corresponding to a position of each of the plurality of light transmission patterns, and provide the extracted hologram data to the spatial light modulator.

The plurality of display pixels of the spatial light modulator may correspond to the plurality of light transmission patterns, respectively, and each of the plurality of display pixels may display a hologram pattern based on a position of each of the plurality of light transmission patterns corresponding thereto.

The plurality of light transmission patterns of the optical element may include a plurality of openings that are irregularly provided on an opaque substrate.

A size of each of the plurality of openings may be less than a size of each of the plurality of display pixels of the spatial light modulator.

One or more openings of the plurality of openings may correspond to each of the plurality of display pixels of the spatial light modulator.

Each of the plurality of openings may correspond to each of the display pixels of the spatial light modulator.

Some of the plurality of display pixels of the spatial light modulator may not correspond to an opening among the plurality of openings.

Relative positions between the plurality of display pixels of the spatial light modulator and the plurality of openings of the optical element respectively corresponding thereto may be irregular.

A relative position between a first display pixel of the spatial light modulator and a first opening of the optical element corresponding thereto may be different from a relative position between a second display pixel of the spatial light modulator and a second opening of the optical element corresponding thereto.

A number of the plurality of openings of the optical element may be equal to or greater than a number of the plurality of display pixels of the spatial light modulator.

The number of the plurality of openings of the optical element may be equal to the number of the plurality of display pixels of the spatial light modulator.

The plurality of light transmission patterns of the optical element may include a plurality of micro lenses provided irregularly and two-dimensionally.

A number of the plurality of micro lenses of the optical element may be equal to or greater than a number of the plurality of display pixels of the spatial light modulator.

The number of the plurality of micro lenses of the optical element may be equal to the number of the plurality of display pixels of the spatial light modulator.

One or more micro lenses among the plurality of micro lenses may correspond to each of the plurality of display pixels of the spatial light modulator.

Each of the one micro lens may correspond to each of the plurality of display pixels of the spatial light modulator.

Some of the plurality of display pixels of the spatial light modulator may not correspond to a micro lens among the plurality of micro lenses.

Relative positions between the plurality of display pixels of the spatial light modulator and centers of the plurality of micro lenses of the optical element respectively corresponding thereto may be irregular.

A relative position between a first display pixel of the spatial light modulator and a center of a first micro lens of the optical element corresponding thereto may be different from a relative position between a second display pixel of the spatial light modulator and a center of a second micro lens of the optical element corresponding thereto.

The spatial light modulator may further include a color filter array that includes a plurality of first color filters configured to transmit only light of a first wavelength, a plurality of second color filters configured to transmit only light of a second wavelength that is different from the first wavelength, and a plurality of third color filters configured to transmit only light of a third wavelength that is different from the first wavelength and the second wavelength.

The plurality of first color filters, the plurality of second color filters, and the plurality of third color filters may be irregularly provided in the color filter array.

Relative positions between the plurality of first color filters of the spatial light modulator and the plurality of light transmission patterns of the optical element respectively corresponding thereto may be irregular, relative positions between the plurality of second color filters of the spatial light modulator and the plurality of light transmission patterns of the optical element respectively corresponding thereto may be irregular, and relative positions between the plurality of third color filters of the spatial light modulator and the plurality of light transmission patterns of the optical element respectively corresponding thereto may be irregular.

The optical element may further include a first optical element including a plurality of openings provided irregularly in an opaque substrate, and a second optical element including a plurality of micro lenses provided irregularly and two-dimensionally.

The holographic display apparatus may further include an eye tracker configured to track a pupil position of an observer.

The light source may include a first light source configured to emit light to form a first hologram image with a first viewing point, and a second light source configured to emit light to form a second hologram image with a second viewing point different from the first viewing point.

The holographic display apparatus may further include an actuator configured to adjust positions of the first light source and the second light source based on the pupil position of the observer provided from the eye tracker.

The holographic display apparatus may further include an illumination optical system configured to transmit the light emitted from the light source to the spatial light modulator.

The illumination optical system may include a light guide plate that includes an input coupler, an output coupler, and a beam deflector configured to provide the light emitted from the light source to the input coupler, and the beam deflector may be further configured to adjust an incidence angle of the light incident on the input coupler based on to pupil position information of the observer provided from the eye tracker.

According to an aspect of another example embodiment, there is provided a display method performed by a holographic display apparatus including a spatial light modulator configured to form a hologram pattern to modulate an incident light and reproduce a hologram image and including a plurality of display pixels that are provided two-dimensionally, and an optical element provided opposite to a light incidence surface of the spatial light modulator or a light exit surface of the spatial light modulator and including an array of a plurality of light transmission patterns that are provided irregularly, the display method includes calculating a computer generated hologram (CGH) having a resolution greater than an actual resolution of the spatial light modulator, sampling the calculated CGH based on positions of the plurality of light transmission patterns of the optical element, and forming, by the spatial light modulator, a hologram pattern based on the sampled CGH data.

The plurality of light transmission patterns of the optical element may include a plurality of openings that are irregularly provided in an opaque substrate.

A size of each of the plurality of openings may be less than a size of each of the plurality of display pixels of the spatial light modulator.

A ratio of the resolution of the calculated CGH to the actual resolution of the spatial light modulator may be equal to a ratio of an area of each of the plurality of display pixels to an area of each of the plurality of openings.

A ratio of the resolution of the calculated CGH to the actual resolution of the spatial light modulator may be equal to a ratio of an entire area of the plurality of display pixels to an entire area of the plurality of openings.

Relative positions between the plurality of display pixels of the spatial light modulator and the plurality of openings of the optical element respectively corresponding thereto may be irregular.

The plurality of light transmission patterns of the optical element may include a plurality of micro lenses that are provided irregularly and two-dimensionally.

Relative positions between the plurality of display pixels of the spatial light modulator and centers of the plurality of micro lenses of the optical element respectively corresponding thereto may be irregular.

A ratio of the resolution of the calculated CGH to the actual resolution of the spatial light modulator may correspond to a refractive power of each of the plurality of micro lenses.

According to an aspect of another example embodiment, there is provided a holographic display apparatus including a light source configured to emit light, a spatial light modulator configured to form a hologram pattern to modulate the light incident thereon and reproduce a hologram image, the spatial light modulator including a plurality of display pixels that are provided two-dimensionally, and an optical element including a plurality of light transmission patterns that include a plurality of openings that are irregularly provided on an opaque substrate, wherein the plurality of display pixels of the spatial light modulator corresponds to the plurality of light transmission patterns, respectively, and wherein a size of each of the plurality of openings being less than a size of each of the plurality of display pixels of the spatial light modulator.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
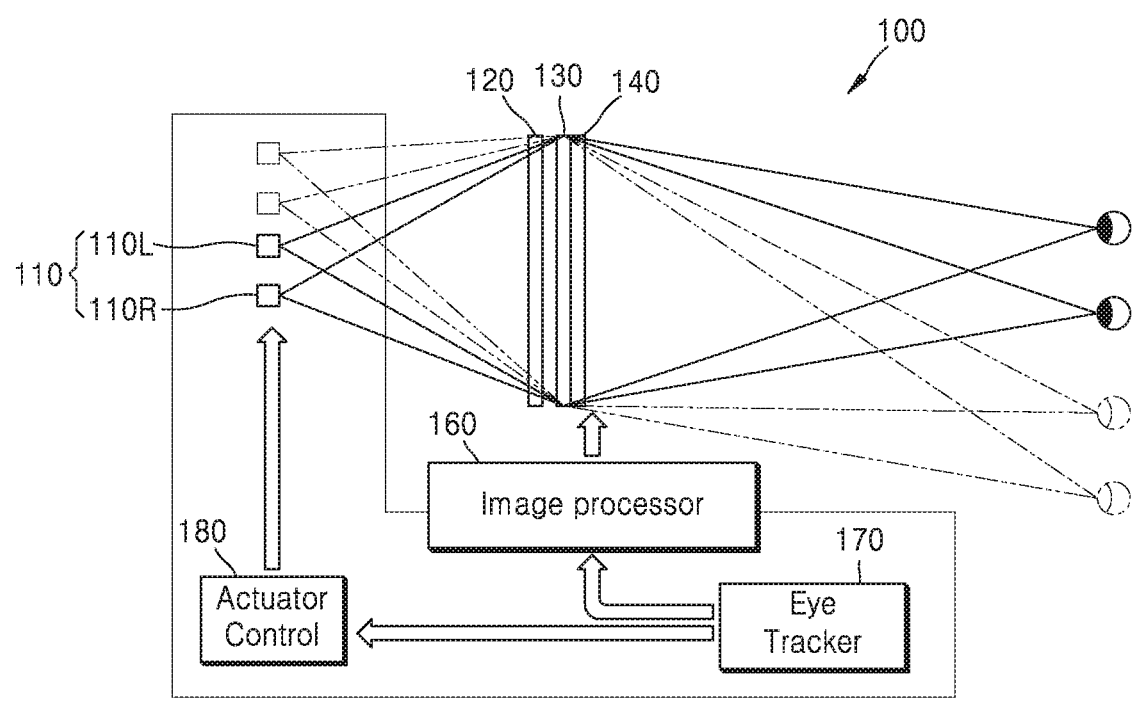
FIG. 1 is a diagram showing a configuration of a holographic display apparatus according to an example embodiment.

Hereinafter, with reference to the accompanying drawings, a holographic display apparatus and method for providing an expanded viewing window will be described in detail. Like reference numerals refer to like elements throughout, and in the drawings, sizes of elements may be exaggerated for clarity and convenience of explanation. The example embodiments described below are merely exemplary, and various modifications may be possible from the example embodiments. In a layer structure described below, an expression "above" or "on" may include not only "immediately on in a contact manner" but also "on in a non-contact manner". As used herein, the term "and/or" includes any and all combinations of one or more of the associated listed items.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a schematic diagram showing a configuration of a holographic display apparatus 100 according to an example embodiment. Referring to FIG. 1, the holographic display apparatus 100 according to an example embodiment may include a light source 110 for providing light, a spatial light modulator 130 for forming a hologram pattern for modulating incident light to reproduce a holographic image, a focusing optical system 120 for focusing the holographic image on a space, and an optical element 140 for expanding a viewing window. The holographic display apparatus 100 may further include an image processor 160 for generating a hologram signal according to a hologram image to be reproduced and providing the hologram signal to the spatial light modulator 130, an eye tracker 170 for tracking a pupil position of an observer, and an actuator 180 for driving the light source 110 in response to pupil position information provided by the eye tracker 170.

In FIG. 1, the focusing optical system 120, the spatial light modulator 130, and the optical element 140 are sequentially arranged along a traveling direction of an illumination light from the light source 110, but this is merely an example. An arrangement order of the focusing optical system 120, the spatial light modulator 130, and the optical element 140 may be arbitrarily selected differently. For example, the focusing optical system 120 may be disposed last on a path of the illumination light. Further, the optical element 140 may be arranged to face a light entering surface of the spatial light modulator 130 or to face a light exiting surface of the spatial light modulator 130.

The light source 110 may include a first light source 110L to emit light for a hologram image to be formed in a left eye of the observer and a second light source 110R to emit light for a hologram image to be formed in a right eye of the observer. Each of the first light source 110L and the second light source 110R may be arranged to provide illumination light at an angle incident on the spatial light modulator 130. For example, the first light source 110L may be disposed on the opposite side of the left eye of the observer with respect to the spatial light modulator 130, and the second light source 110R may be disposed on the opposite side of the right eye of the observer with respect to the spatial light modulator 130.

The first light source 110L and the second light source 110R may include laser diodes to provide illumination light having high coherence. However, embodiments are not limited thereto. For example, when the illumination light has a certain degree of spatial coherence, since the illumination light may be sufficiently diffracted and modulated by the spatial light modulator 130, a light-emitting diode (LED) may be used as the first light source 110L and the second light source 110R. In addition to the LED, any other light sources may be used as long as light having spatial coherence is emitted. Although one first light source 110L and one second light source 110R are illustrated in FIG. 1, the first light source 110L and the second light source 110R may include an array of a plurality of lasers or LEDs.

The spatial light modulator 130 may form a hologram pattern for diffracting and modulating the illumination light, according to a hologram data signal, e.g. a computer-generated hologram (CGH) data signal, provided by the image processor 160. To this end, the spatial light modulator 130 may include a plurality of two-dimensionally arranged display pixels. The spatial light modulator 130 may use any one of a phase modulator for performing phase modulation, an amplitude modulator for performing amplitude modulation, and a complex modulator performing both phase modulation and amplitude modulation. Although the spatial light modulator 130 of FIG. 1 is a transmissive spatial light modulator, a reflective spatial light modulator may also be used. The transmissive spatial light modulator may use, for example, a semiconductor modulator based on a compound semiconductor such as gallium arsenide (GaAs), or a liquid crystal device (LCD). The reflective spatial light modulator may use, for example, a digital micromirror device (DMD), liquid crystal on silicon (LCoS) technology, or a semiconductor modulator.

The image processor 160 may be configured to generate a hologram signal according to a hologram image to be provided to the observer, provide the hologram signal to the spatial light modulator 130, and control an operation of the light source 110. For example, the image processor 160 may control turning on and off of the first light source 110L and the second light source 110R. The image processor 160 may be implemented using software, or may be implemented in the form of a semiconductor chip in which functions of such software are embedded.

The eye tracker 170 may obtain an image of the observer through a camera or the like, detect a pupil of the observer in the image, and analyze a position of the pupil. The eye tracker 170 may track change in a pupil position of the observer in real time and provide a result to the image processor 160. The image processor 160 may then generate a hologram signal in response to pupil position information of the observer provided by the eye tracker 170. For example, the image processor 160 may generate the hologram signal in accordance with a change in viewpoint according to a change in the pupil position of the observer and may provide the generated hologram signal to the spatial light modulator 130. Also, the image processor 160 may control the actuator 180 to change positions of the first light source 110L and the second light source 110R such that the illumination light proceeds toward the pupil of the observer.

The focusing optical system 120 may focus a reproduction light formed by modulating the illumination light by the spatial light modulator 130 onto a predetermined space. For example, the focusing optical system 120 may focus the reproduction light on the pupil position of the observer. The reproducing light may be focused on a space by the focusing optical system 120 such that the hologram image may be formed on the space.

Figure 2:
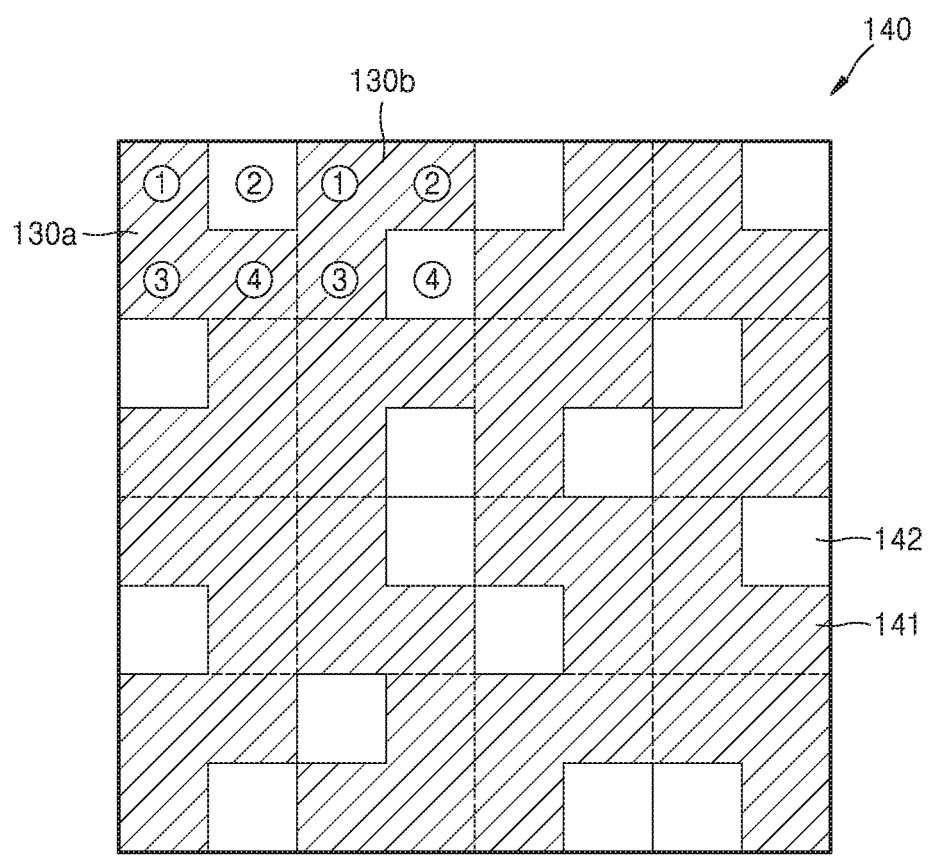
FIG. 2 illustrates an example of a configuration of an optical element according to an example embodiment.

The optical element 140 may include an array of a plurality of light transmission patterns irregularly arranged at random. For example, FIG. 2 illustrates an example of a configuration of the optical element 140 according to an example embodiment. Referring to FIG. 2, the optical element 140 may include an opaque substrate 141 for blocking light and a plurality of openings 142 irregularly arranged on the opaque substrate 141. The opening 142 may be formed by completely penetrating through the opaque substrate 141 and may transmit light. Accordingly, the plurality of light transmission patterns of the optical element 140 may correspond to the plurality of openings 142.

Square lattices indicated by dotted lines in FIG. 2 may correspond to display pixels of the spatial light modulator 130. As shown in FIG. 2, one opening 142 may correspond to one display pixel of the spatial light modulator 130. Thus, the openings 142 of the optical element 140 may be in one to one correspondence with the display pixels of the spatial light modulator 130, and the number of the openings 142 of the optical element 140 may correspond to the number of the display pixels of the spatial light modulator 130. Further, a size of the opening 142 may be less than a size of the corresponding display pixel of the spatial light modulator 130. In this regard, it may be seen that the array of light transmission patterns of the optical element 140 has a resolution greater than that of the spatial light modulator 130. In FIG. 2, the size of the opening 142 of the optical element 140 is about a quarter of the display pixel of the spatial light modulator 130, but embodiments are not limited thereto.

According to the example embodiment, relative positions between the plurality of display pixels of the spatial light modulator 130 and the plurality of respectively corresponding openings 142 of the optical element 140 may be irregularly set. Each of the openings 142 may be located in a partial region of the corresponding display pixel because the size of each of the openings 142 is less than that of each of the plurality of display pixels of the spatial light modulator 130. Positions of the openings 142 corresponding to each of the plurality of display pixels may be irregularly and randomly different. For example, the relative position between any one display pixel of the spatial light modulator 130 and one corresponding opening 142 of the optical element 140 may be different from the relative positions between the other display pixels of the spatial light modulator 130 and the other corresponding openings 142 of the optical element 140, and a degree of difference may be irregular.

Therefore, when the optical element 140 is disposed on a light entering surface of the spatial light modulator 130, an illumination light may be incident on a plurality of partial regions smaller than the display pixel of the spatial light modulator 130. Also, when the optical element 140 is disposed on a light exiting surface of the spatial light modulator 130, only light emitted from the plurality of partial regions smaller than the display pixel of the spatial light modulator 130 may be seen. As a result, a configuration in which the spatial light modulator 130 and the optical element 140 are combined may obtain the same effect as that of displaying an image for a spatial light modulator having a resolution greater than that of the spatial light modulator 130 by having the effect of turning off some of the display pixels and displaying only some of the display pixels that are irregularly arranged. Generally, a size of a viewing window of the holographic display apparatus 100 increases as the resolution of the spatial light modulator 130 increases, thereby providing an expanded viewing window that is larger than a size of a viewing window determined by the actual resolution of the spatial light modulator 130 by using the optical element 140.

An operation of the holographic display apparatus 100 will now be described below. The image processor 160 may generate a hologram data signal and provide the hologram data signal to the spatial light modulator 130. The hologram data signal may be a CGH signal computed to reproduce a target holographic image on a space. The image processor 160 may generate the hologram data signal according to a holographic image to be reproduced. The spatial light modulator 130 may form a hologram pattern on a surface of the spatial light modulator 130 according to the hologram data signal provided from the image processor 160. A principle of the spatial light modulator 130 forming the hologram pattern may be the same as a principle of, for example, a display panel displaying an image. For example, the hologram pattern may be displayed on the spatial light modulator 130 as an interference pattern including information regarding the holographic image to be reproduced.

Simultaneously, the light source 110 may provide the light to the spatial light modulator 130. The light incident on the spatial light modulator 130 may be diffracted and interfered with by the hologram pattern formed by the spatial light modulator 130. Then, the diffracted and interfered light may be focused on the focal plane of the focusing optical system 120, and a three-dimensional holographic image may be reproduced on a predetermined space in front of the spatial light modulator 130. A shape and a depth of the holographic image to be reproduced may be determined according to the hologram pattern formed by the spatial light modulator 130.

According to the example embodiment, because there is the effect that the resolution of the spatial light modulator 130 increases by the optical element 140, a space in which a hologram image is reproduced and viewed, that is, the viewing window may be expanded. To this end, the image processor 160 may calculate a CGH at a resolution greater than the actual resolution of the spatial light modulator 130 to generate the hologram data signal. For example, a ratio of the resolution of the CGH computed by the image processor 160 to the actual resolution of the spatial light modulator 130 may be substantially the same as a ratio of an area of each display pixel of the spatial light modulator 130 to an area of each opening 142. In other words, the image processor 160 may calculate the CGH at a resolution corresponding to the resolution of the array of light transmission patterns of the optical element 140. For example, when the size of the opening 142 of the optical element 140 is the quarter of the display pixel of the spatial light modulator 130, the image processor 160 may calculate the CGH at a resolution four times greater than the actual resolution of the spatial light modulator 130. The ratio of the resolution of the CGH calculated by the image processor 160 to the actual resolution of the spatial light modulator 130 may be substantially the same as a ratio of the entire area of the display pixel of the spatial light modulator 130 to the entire area of the plurality of openings 142.

Then, the image processor 160 may sample the CGH in accordance with the positions of the plurality of openings 142 of the optical element 140. For example, in the entire CGH data, only CGH data of a part that is visible through the opening 142 of the optical element 140 may be extracted, except data that is not substantially used by being covered by the opaque substrate 141 of the optical element 140. For example, when the size of the opening 142 of the optical element 140 is the quarter of the display pixel of the spatial light modulator 130, the image processor 160 may split one display pixel of the spatial light modulator 130 into four regions indicated by ①, ②, ③ and ④ in FIG. 2, and calculate the CGH with high resolution for each of the four regions ①, ②, ③, and ④. In FIG. 2, the image processor 160 may extract and provide only CGH data of high resolution corresponding to a position of the region ② to the first display pixel 130a arranged in the leftmost column of the uppermost row, and extract and provide only CGH data of high resolution corresponding to a position of the region ④ to the second display pixel 130b arranged in a second column of the uppermost row.

Then, the first display pixel 130a of the spatial light modulator 130 may display a hologram pattern corresponding to the position of the region ②, and the second display pixel 130b may display a hologram pattern corresponding to the position of the region ④. In this case, in FIG. 2, the CGH data corresponding to the positions ①, ③, and ④ of the first display pixel 130a may be calculated but not displayed. Likewise, in FIG. 2, the CGH data corresponding to the positions ①, ②, and ③ of the second display pixel 130b may be calculated but not displayed. As a result, the image processor 160 may process the data as if each of the openings 142 of the optical element 140 is a display pixel of a virtual spatial light modulator.

Instead, the image processor 160 may supplement the sampled CGH data through interpolation or extrapolation such that the sampled CGH data may further include information of the part covered by the opaque substrate 141. For example, the image processor 160 may simply average the CGH data corresponding to the regions ①, ②, ③, and ④ in one display pixel of the spatial light modulator 130 and provide the averaged CGH data to the spatial light modulator 130. Then, each of the first display pixel 130a and the second display pixel 130b may display the hologram pattern based on the averaged CGH data with respect to the regions ①, ②, ③, and ④ thereof.

The CGH data may be extracted by changing a weight of the region covered by the opaque substrate 141 and the region seen through the opening 142. For example, the image processor 160 may provide CGH data, to the spatial light modulator 130, averaged by multiplying the CGH data corresponding to the region ②, of the first display pixel 130a in FIG. 2 by a first weight and multiplying the CGH data corresponding to the regions ①, ③, and ④ by a second weight less than the first weight. Likewise, the image processor 160 may provide CGH data, to the spatial light modulator 130, averaged by multiplying the CGH data corresponding to the region ④ of the second display pixel 130b by the first weight and multiplying the CGH data corresponding to the regions ①, ②, and ③ by the second weight less than the first weight in FIG. 2.

Information about the covered part between adjacent display pixels of the spatial light modulator 130 may be further considered. For example, the image processor 160 may provide CGH data, to the spatial light modulator 130, averaged by multiplying the CGH data corresponding to the region ② of the first display pixel 130a by the first weight, multiplying the CGH data corresponding to the regions ①, ③, and ④ by the second weight, and multiplying the CGH data corresponding to the regions ① and ③ of the second display pixel 130b by a third weight less than the second weight in FIG. 2. Instead, the image processor 160 may provide the CGH data, to the spatial light modulator 130, averaged by multiplying CGH data of a region away from the opening 142 with respect to each of the openings 142 by an increasingly smaller weight.

The image processor 160 may provide final high resolution CGH data generated in the above described manner to the spatial light modulator 130. The spatial light modulator 130 may display the hologram pattern on a screen using the sampled high resolution CGH data. Then, a virtual spatial light modulator having a resolution greater than that of the spatial light modulator 130 may obtain the same effect as that of displaying an image of high resolution for a spatial light modulator having a resolution greater than that of the spatial light modulator 130 to turn off some of the display pixels and to display only some of the display pixels that are irregularly arranged. Therefore, an expanded viewing window that is larger than the size of the viewing window determined by the actual resolution of the spatial light modulator 130 may be obtained.

However, because the spatial light modulator 130 is configured with an array of a plurality of display pixels, a physical array structure of the plurality of display pixels may function as a diffraction lattice. Thus, the illumination light may be diffracted and interfered with not only by the hologram pattern formed by the spatial light modulator 130 but also by regular pixel lattices configured with the array of the display pixels of the spatial light modulator 130. Also, some of the illumination light may not be diffracted by the hologram pattern, but may pass through the spatial light modulator 130 as it is. As a result, a plurality of lattice spots may appear on the focal plane (or the pupil plane) of the focusing optical system 120 on which the holographic image is converged to a point. The plurality of lattice spots may function as image noise that degrades quality of the reproduced holographic image and makes it uncomfortable to observe the holographic image by the observer. For example, a 0th order noise formed by the illumination light which is not diffracted may appear on an axis of the focusing optical system 120. Also, higher order noises of a regular lattice pattern may appear around the 0th order noise by interference between light diffracted by the regular display pixel structure of the spatial light modulator 130.

To prevent or reduce the noises from being seen by the observer, the holographic image may be reproduced via an off-axis technique such that a spot of the holographic image is reproduced while avoiding the noises. The noises are generated due to an internal structure of the spatial light modulator 130 and are unrelated to the hologram pattern, and thus positions of the noises are always fixed. However, a spot position of the holographic image is determined according to the hologram pattern, and thus the hologram pattern may be formed such that the holographic image is reproduced at a position where the noises are not present. For example, the image processor 160 may add a prism phase to the CGH data including the hologram image information. Then, the hologram image may be reproduced off from the optical axis of the focusing optical system 120 by a prism pattern displayed in addition to the hologram pattern in the spatial light modulator 130. Therefore, the reproduced hologram image may be away from the 0th order noise.

According to the example embodiment, the position of the reproduced hologram image may be further away from the 0th order noise by expanding the viewing window by the optical element 140. Further, according to the example embodiment, the openings 142 of the optical element 140 are irregularly arranged, and thus a high-order noise generated by the regular display pixel structure of the spatial light modulator 130 may be attenuated or removed.

Figure 3:
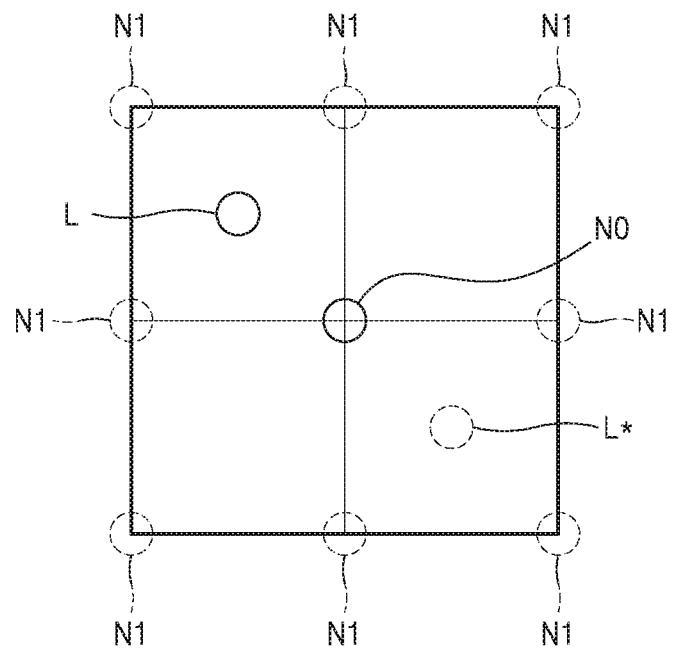
FIG. 3 illustrates an example of a distribution of light in a pupil plane of an observer's eye by a holographic display apparatus according to a related example that does not include an optical element.

For example, FIG. 3 illustrates an example of a distribution of light in a pupil plane of an observer's eye by a holographic display apparatus according to a related example that does not use the optical element 140. Referring to FIG. 3, a $0^{th}$ order noise N0 due to a 0th order diffraction may be formed on the center of the pupil plane, that is, on an optical axis. Further, around the $0^{th}$ order noise N0, higher order noises N1 generated by higher order diffraction more than $\pm 1^{st}$ order may be regularly formed in the form of a lattice. In FIG. 3, a rectangle indicated in a thick solid line surrounded by the high order noises N1 may be a viewing window determined by the resolution of the spatial light modulator 130. The higher order noises N1 may be regularly generated outside the viewing window.

A hologram image L may be reproduced slightly away from the $0^{th}$ order noise N0 using an off-axis technique. A complex conjugate image may be generated on the opposite side of the hologram image L with respect to the $0^{th}$ order noise N0. The expression limit of a prism phase may be less than the pixel pitch of the spatial light modulator 130 even though the off-axis technique is used, as shown in FIG. 3, the hologram image L may not be farther away from the higher order noises N1. In other words, the hologram image L may not be reproduced beyond the viewing window determined by the resolution of the spatial light modulator 130.

Figure 4:
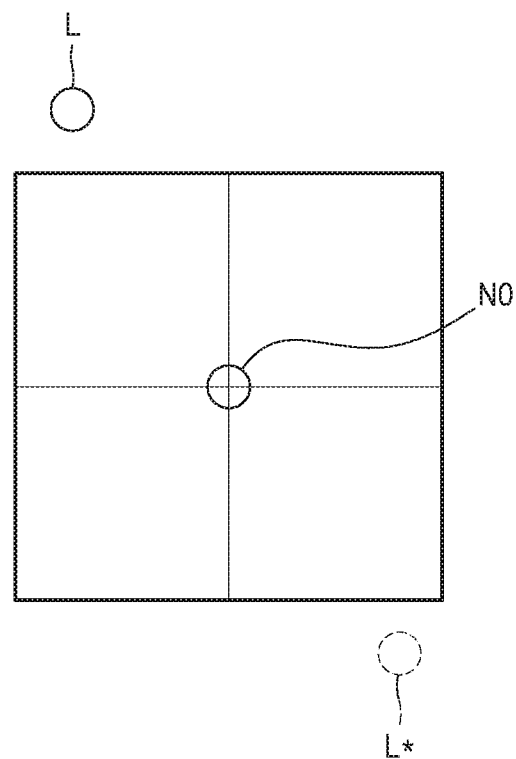
FIG. 4 illustrates an example of a distribution of light in a pupil plane of an observer's eye by a holographic display apparatus according to an example embodiment that includes the optical element.

FIG. 4 illustrates an example of a distribution of light in a pupil plane of an observer's eye by the holographic display apparatus 100 according to an example embodiment that uses the optical element 140. Referring to FIG. 4, the $0^{th}$ order noise N0 may be formed due to a 0th order diffraction on the center of the pupil plane. However, due to an irregular arrangement of the openings 142 of the optical element 140, the higher order noises N1 generated by a higher order diffraction more than $\pm 1^{st}$ order may be hardly generated.

The hologram image L may be reproduced beyond the viewing window determined by the resolution of the spatial light modulator 130 due to the openings 142 of the optical element 140 having a size less than a display pixel of the spatial light modulator 130.

Therefore, the viewing window may be substantially expanded, and the hologram image L may be farther away from the 0th order noise N0, and thus the hologram image L may be viewed more comfortably. Also, when the viewing window is expanded as mentioned above, even though the precision of the eye tracker 170 and the actuator 180 is reduced, it may be easy to reproduce the hologram image L in the viewing window. Therefore, the hologram image L of a low crosstalk may be reproduced without using the high-priced eye tracker 170 having high precision and the actuator 180.

Figure 5:
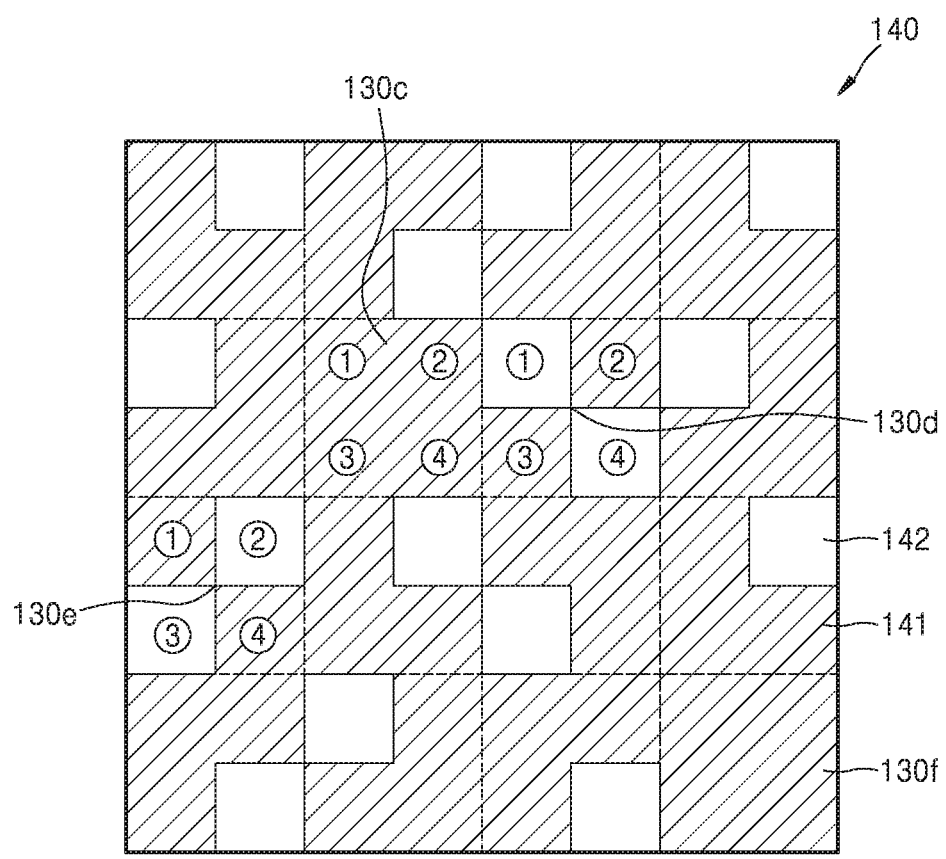
FIG. 5 illustrates an example of a configuration of an optical element according to an example embodiment.

In case of the optical element 140 shown in FIG. 2, one opening 142 may be disposed for each display pixel of the spatial light modulator 130. In other words, the display pixels of the spatial light modulator 130 and the openings 142 of the optical element 140 may be in one to one correspondence, but embodiments are not limited thereto. An arrangement of the openings 142 may be variously selected. For example, FIG. 5 illustrates an example of a configuration of the optical element 140 according to an example embodiment. Referring to FIG. 5, the opening 142 may not be disposed in some display pixels 130*c* and 130*f* of the spatial light modulator 130, and the two openings 142 may be arranged in other display pixels 130*d* and 130*e*. An arrangement of these openings 142 may be irregularly and randomly determined. The total number of the openings 142 of the optical element 140 may be designed to be equal to or greater than the total number of the openings 142 of the optical element 140 even though the display pixels of the spatial light modulator 130 and the openings 142 of the optical element 140 may not be perfectly in one to one correspondence.

CGH data may be sampled in various ways with respect to the display pixels 130*d* and 130*e* in which the two openings 142 are arranged. For example, in case of the third display pixel 130*d* disposed in a third column of a second row of the spatial light modulator 130, the openings 142 may be disposed in the regions ① and ④, and the regions ② and ③ may be covered by the opaque substrates 141. In this case, the image processor 160 may provide the spatial light modulator 130 with one CGH data arbitrarily selected from CGH data corresponding to the region ① and CGH data corresponding to the region ④. Instead, the image processor 160 may simply provide the spatial light modulator 130 with CGH data obtained by averaging the CGH data corresponding to the region ① and the CGH data corresponding to the region ④. The image processor 160 may provide the spatial light modulator 130 with CGH data obtained by averaging CGH data obtained by multiplying the CGH data corresponding to the regions ① and ④ by a first weight and multiplying the CGH data corresponding to the regions ② and ③ by a second weight less than the first weight. information about the adjacent fourth display pixel 130*c* in which the opening 142 is not disposed may be further considered. For example, the image processor 160 may provide the spatial light modulator 130 with CGH data obtained by averaging CGH data obtained by multiplying the CGH data corresponding to the regions ① and ④ by the first weight, multiplying the CGH data corresponding to the regions ② and ③ by the second weight less than the first weight, and multiplying the CGH data corresponding to the regions ②  and ④  of the fourth display pixel 130c by a third weight less than the second weight.

In case of the fifth display pixel 130e disposed in a first column of a third row of the spatial light modulator 130, the openings 142 may be disposed in the regions ② and ③, and the regions ① and ④ may be covered by the opaque substrates 141. In this case as described above, the image processor 160 may provide the spatial light modulator 130 with one CGH data arbitrarily selected from the CGH data corresponding to the region ② of the fifth display pixel 130e and the CGH data corresponding to the region ③, provide the spatial light modulator 130 with CGH data obtained by averaging the CGH data corresponding to the region ② and the CGH data corresponding to the region ③, provide the spatial light modulator 130 with CGH data obtained by averaging all the CGH data corresponding to the regions ① ② ③ and ④, or provide the spatial light modulator 130 with CGH data obtained by averaging CGH data obtained by multiplying the CGH data corresponding to the regions ② and ③ by the first weight and multiplying the CGH data corresponding to the regions ① and ④ by the second weight. The CGH data may be sampled in further consideration of CGH data with respect to covered regions of adjacent display pixels.

Further, in case of the optical element 140 shown in FIGS. 2 and 5, a size of one opening 142 may be about ¼ of a size of one display pixel. Therefore, a ratio (hereinafter, an occupancy ratio) of an area of the opening 142 occupied in the total area of the optical element 140 may be 25%, but embodiments are not limited thereto. The optical element 140 of various occupancy ratios may be possible. Also, arrangement patterns of the openings 142 of the optical element 140 may be selected in various ways. A degree to which the viewing window is expanded, a degree to which the higher order noises N1 is attenuated, positions of the higher order noises N1, and the like may be different according to the occupancy ratio of the openings 142 of the optical element 140 and pattern forms in which the openings 142 are arranged.

Figure 6:
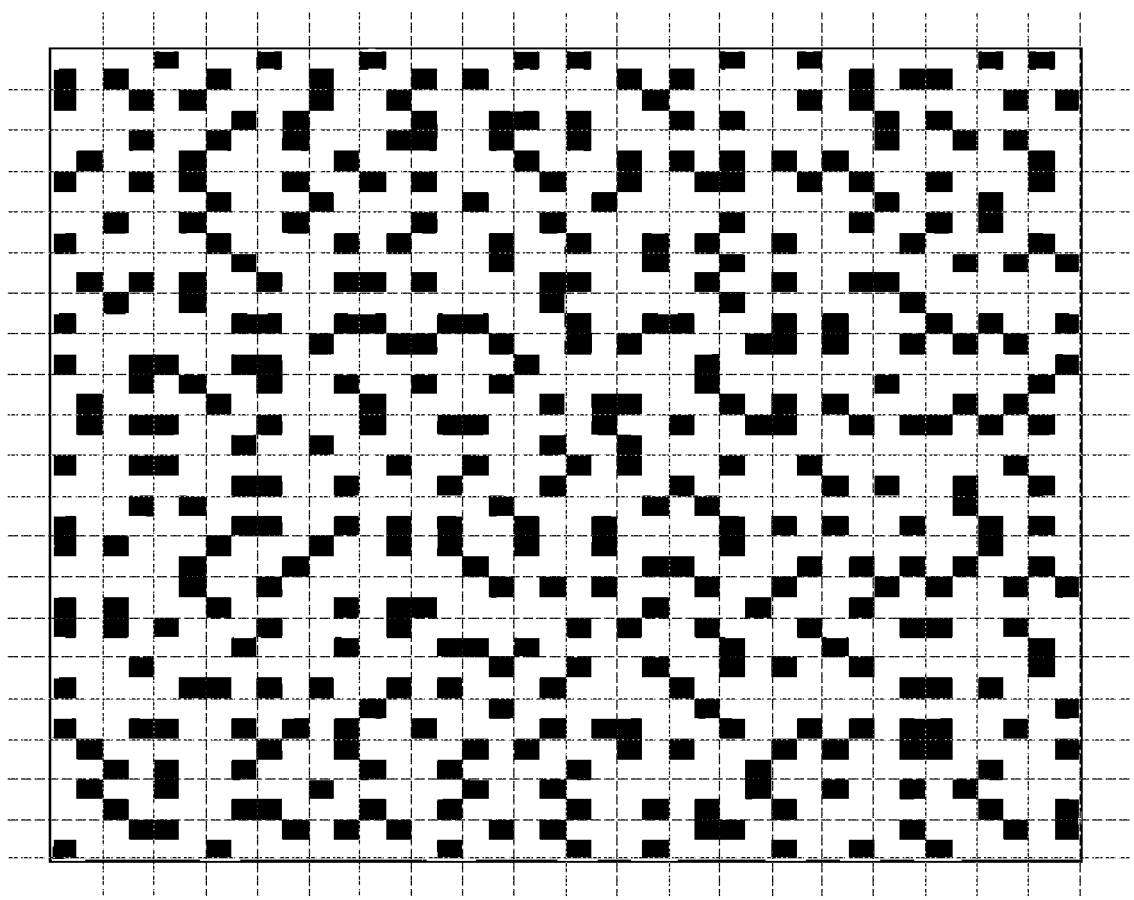
FIG. 6 illustrates an example of a configuration of an optical element according to an example embodiment.
Figure 7:
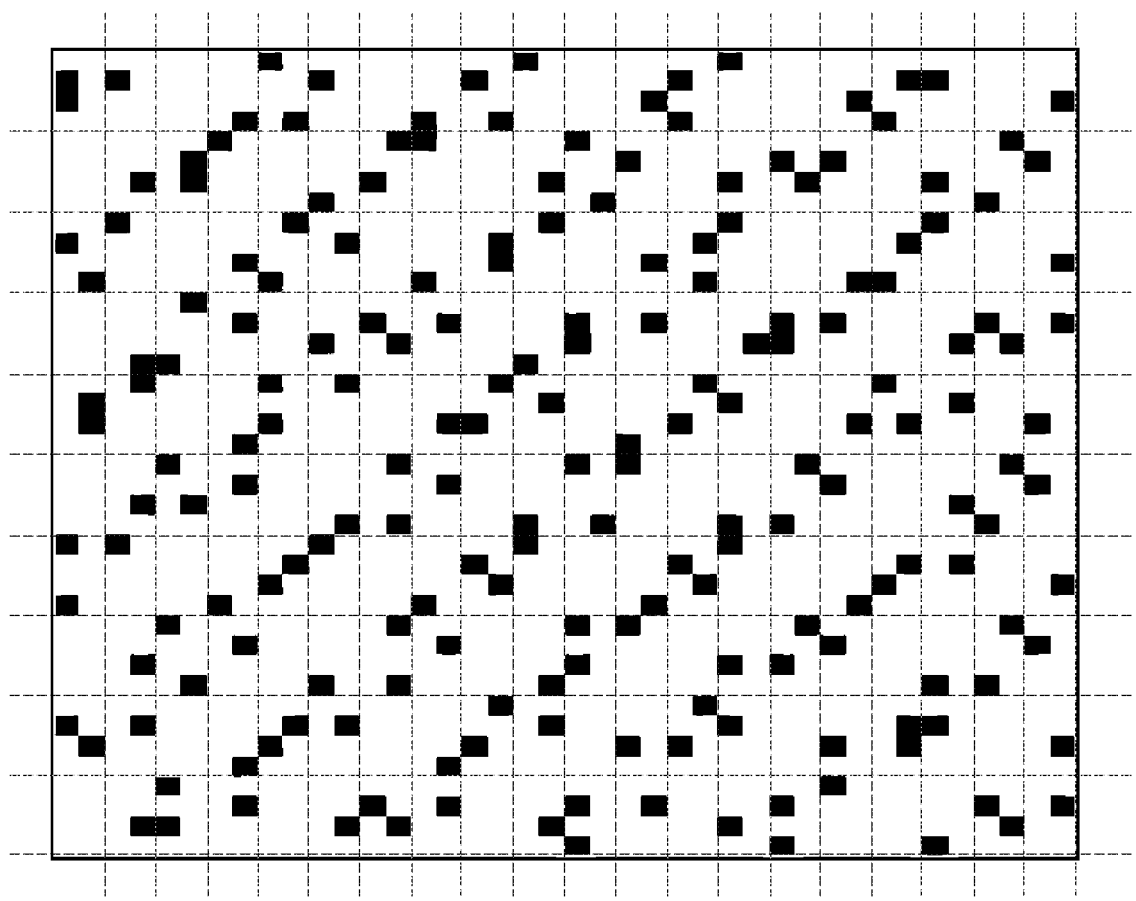
FIG. 7 illustrates an example of a configuration of an optical element according to an example embodiment.
Figure 8:
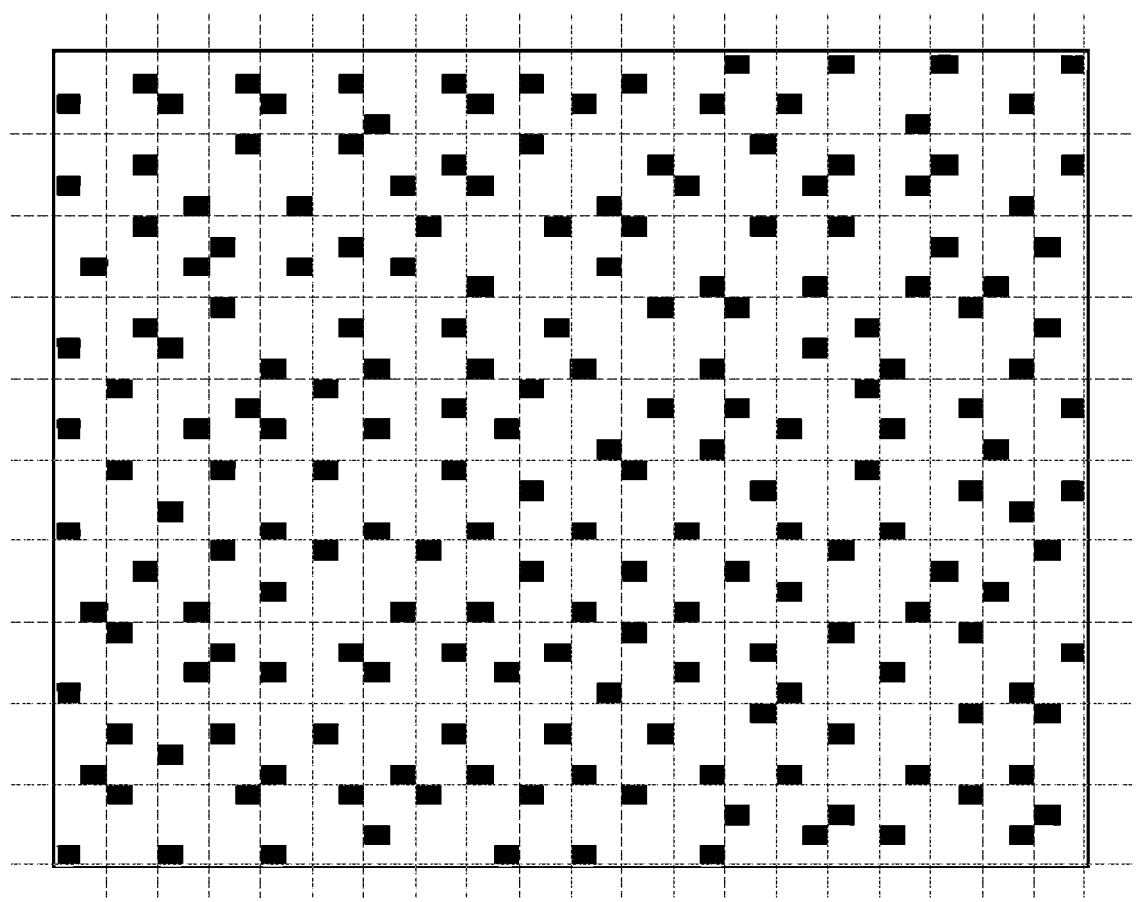
FIG. 8 illustrates an example of a configuration of an optical element according to an example embodiment.
Figure 9:
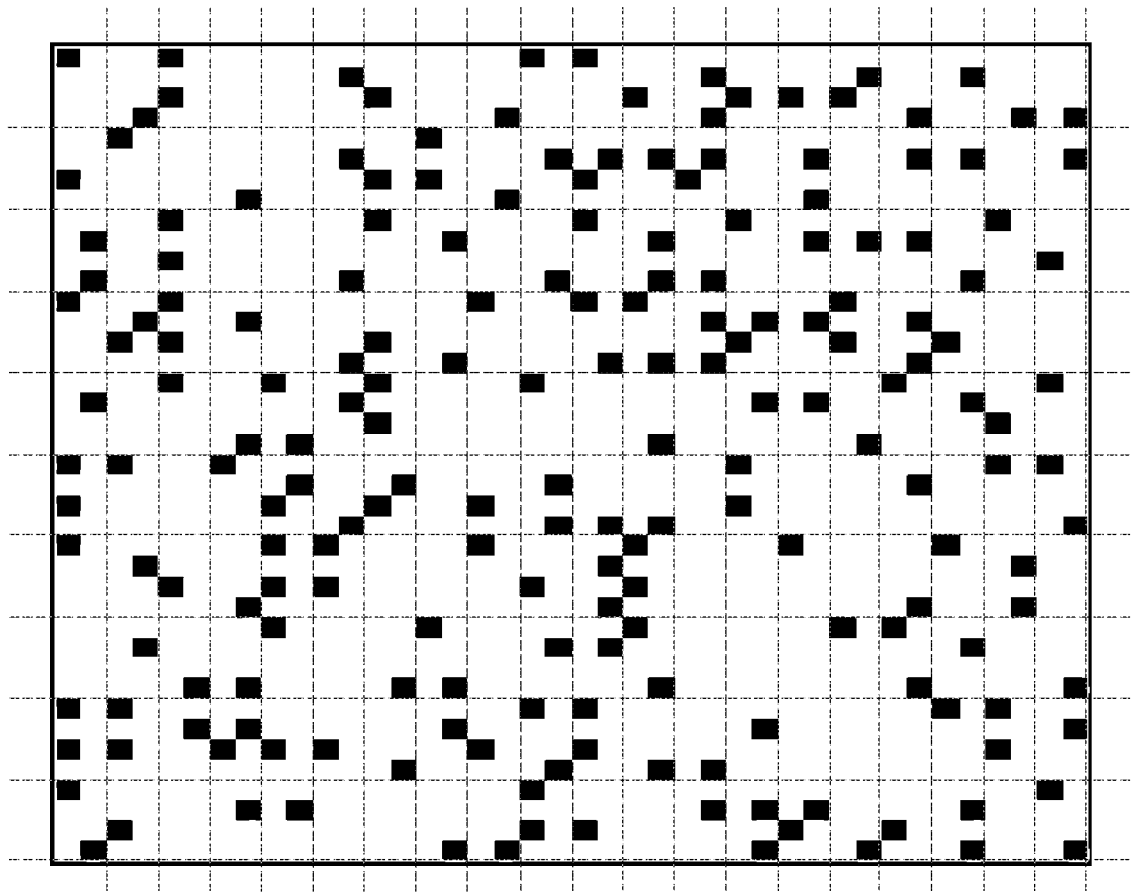
FIG. 9 illustrates an example of a configuration of an optical element according to an example embodiment.
Figure 10:
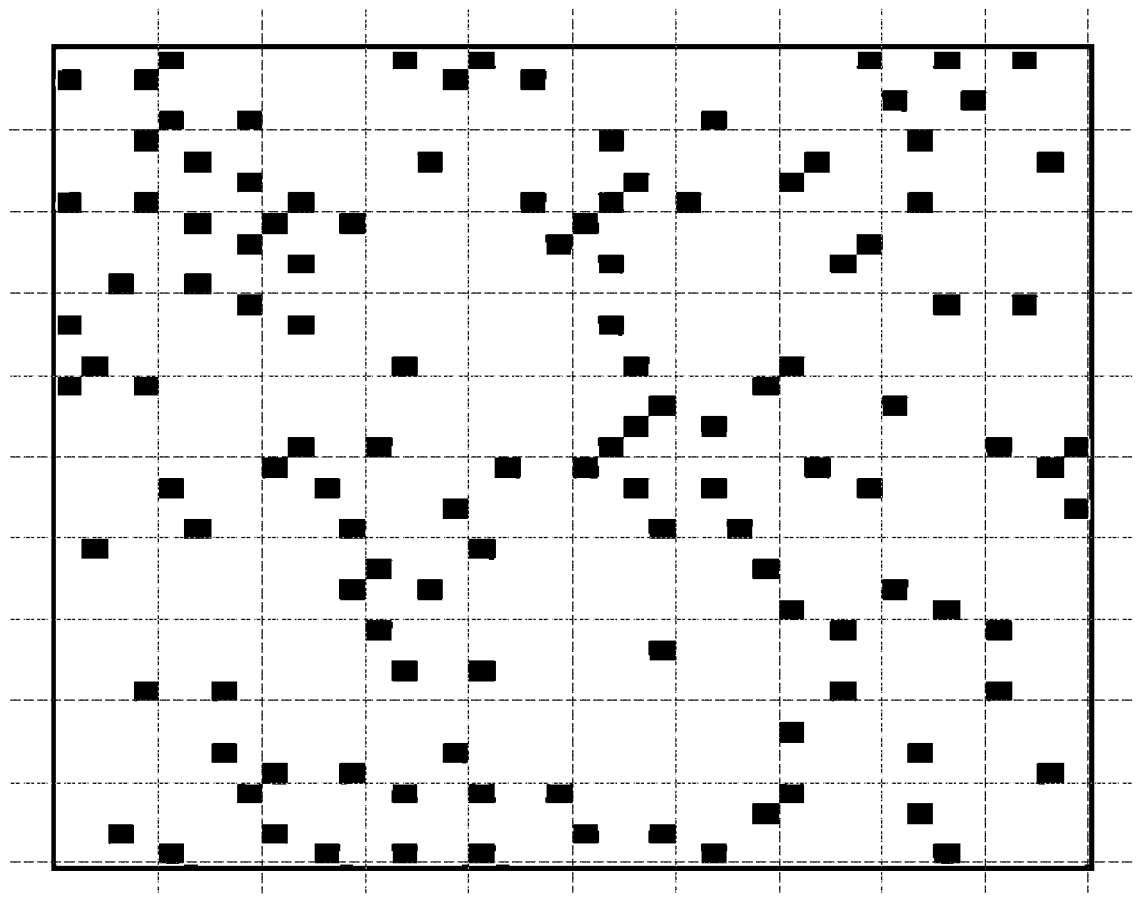
FIG. 10 illustrates an example of a configuration of an optical element according to an example embodiment.

For example, FIGS. 6 to 10 illustrate examples of arrangements of the openings 142 of the optical elements 140 of various occupancy ratios. The optical element 140 shown in FIG. 6 is designed to have the occupancy ratio of about 25%. The optical element 140 shown in FIGS. 7 to 9 is designed to have the occupancy ratio of about 12.5%. The optical element 140 shown in FIG. 10 is designed to have the occupancy ratio of about 7.8%. For example, an area of each opening 142 of the optical element 140 of FIG. 6 is about ¼ less than an area of one display pixel of the spatial light modulator 130, and the number of the openings 142 of the optical element 140 and the number of display pixels in the spatial light modulator 130 may be approximately the same.

However, the area of the opening 142 is not necessarily limited to ¼ of the area of the display pixel of the spatial light modulator 130. For example, in FIGS. 7 to 9, the area of the opening 142 may be about ⅛ less than of the area of one display pixel of the spatial light modulator 130, and the number of the openings 142 of the optical element 140 and the number of display pixels in the spatial light modulator 130 may be approximately the same. Also, in FIG. 10, the area of the opening 142 may be about 1/16 less than the area of one display pixel of the spatial light modulator 130, and the number of the openings 142 of the optical element 140 may be about 1.248 times larger than the number of display pixels in the spatial light modulator 130. For example, 1,248 openings 142 may be randomly allocated with respect to 1,000 display pixels on average.

Also, the area of the opening 142 and the area of the display pixel of the spatial light modulator 130 do not always have to have a relationship of the constant ratio. For example, when the optical element 140 has an occupancy ratio of about 7.8%, the number of the openings 142 in the optical element 140 may be selected to be the same as the number of display pixels in the spatial light modulator 130, and the area of the display region 142 may be selected to be 7.8% of the area of the display pixel of the spatial light modulator 130. Also, a ratio of the resolution of CGH calculated by the image processor 160 to the actual resolution of the spatial light modulator 130 may be generally the same as a ratio of the resolution of each display pixel of the spatial light modulator 130 to the area of each opening 142, but the ratios need not be strictly the same. For example, the size of the opening 142 may be adjusted such that the ratio of the area of each display pixel of the spatial light modulator 130 to the area of each opening 142 may be slightly greater or less than the ratio of the resolution of CGH calculated by the image processor 160 to the actual resolution of the spatial light modulator 130, in consideration of the brightness of a hologram image to be reproduced and a size of a necessary viewing window.

Even in case of the optical element 140 of the same occupancy ratio, a distribution of light in a pupil plane may be slightly different according to an arrangement form of the openings 142. For example, when one of the optical element 140 shown in FIGS. 6, 9 and 10 is used, the higher order noises N1 may not be observed. When one of the optical element 140 shown in FIGS. 7 and 8 is used, the slightly faint higher order noises N1 may be found near the $0^{th}$ order noise N0.

Figure 11:
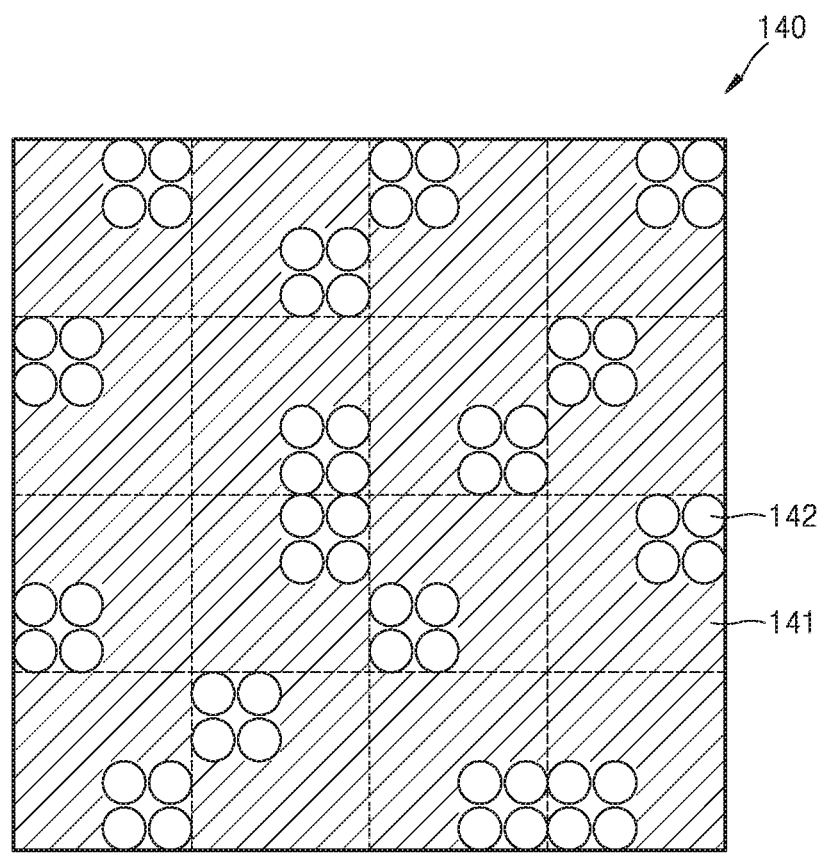
FIG. 11 illustrates an example of a configuration of an optical element according to an example embodiment.

FIG. 11 illustrates an example of a configuration of the optical element 140 according to an example embodiment. Referring to FIG. 11, one opening 142 of the optical element 140 may be configured as an array of several small through holes. For example, although FIG. 11 shows an example in which one opening 142 is configured as the array of four through holes, there is no particular limitation on the number of through holes constituting one opening 142.

The number of display pixels of the spatial light modulator 130 may be very large, and the number of the corresponding openings 142 of the optical element 140 may also be very large. It may be difficult to design all of positions of such a large number of the openings 142 irregularly. It may also be difficult to manufacture one optical element 140 with the same size as the size of the spatial light modulator 130. In this case, the optical element 140 may be manufactured by manufacturing an optical element unit including the plurality of irregularly arranged openings 142 and by repeatedly arranging the same optical element units.

Figure 12:
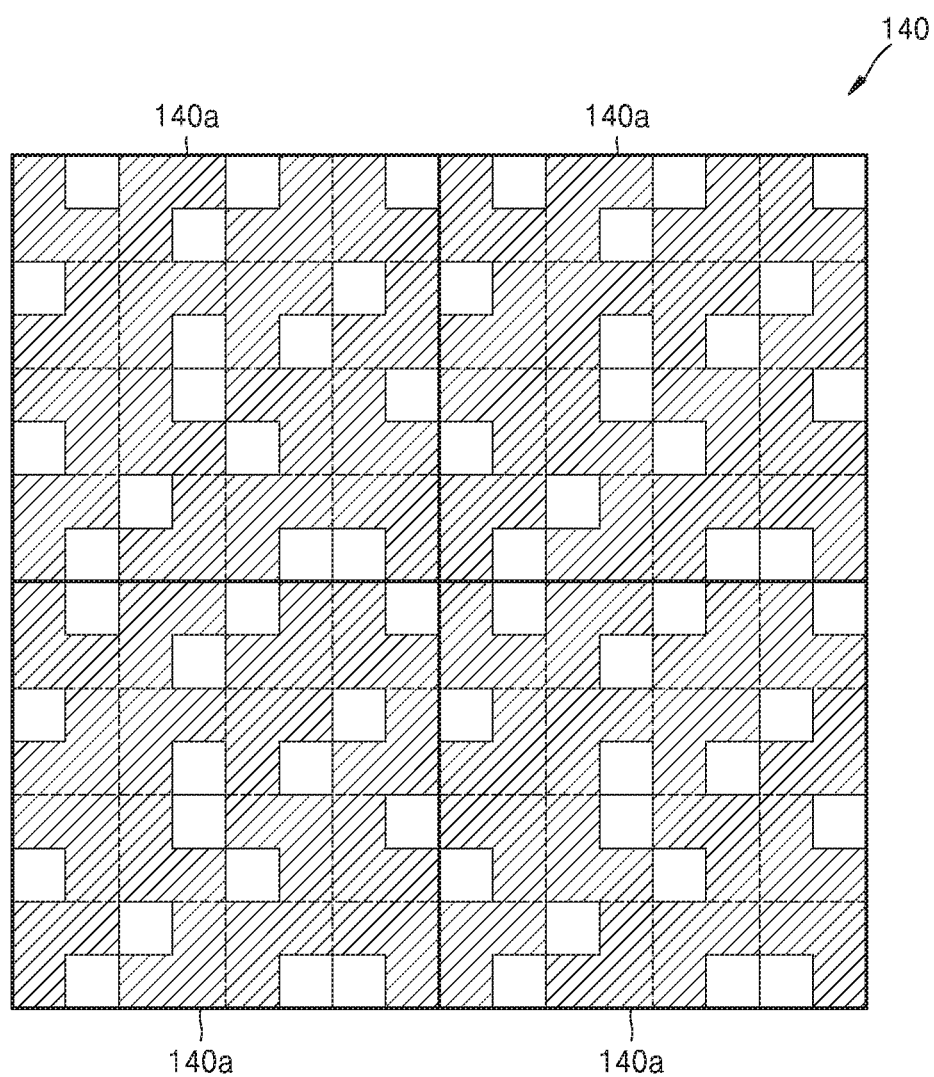
FIG. 12 illustrates an example of a configuration of an optical element according to an example embodiment.

For example, FIG. 12 illustrates an example of a configuration of the optical element 140 according to an example embodiment. Referring to FIG. 12, the optical element 140 may include a plurality of repeatedly arranged optical element units 140a. In each of the optical element units 140a, the plurality of openings 142 may be irregularly arranged. The plurality of optical element units 140a may include all the openings 142 of the same arrangement type. FIG. 12 shows the example of the optical element 140 including the four optical element units 140a, but embodiments are not necessarily limited thereto. The optical element 140 may include a larger number of optical element units 140a. The openings 142 of the optical element 140 shown in FIG. 12 may be irregularly arranged in one optical element unit 140a. However, because the same optical element units 140a are repeated, the optical element 140 may have regularity as much as an arrangement period of the optical element units 140a as a whole.

Figure 13:
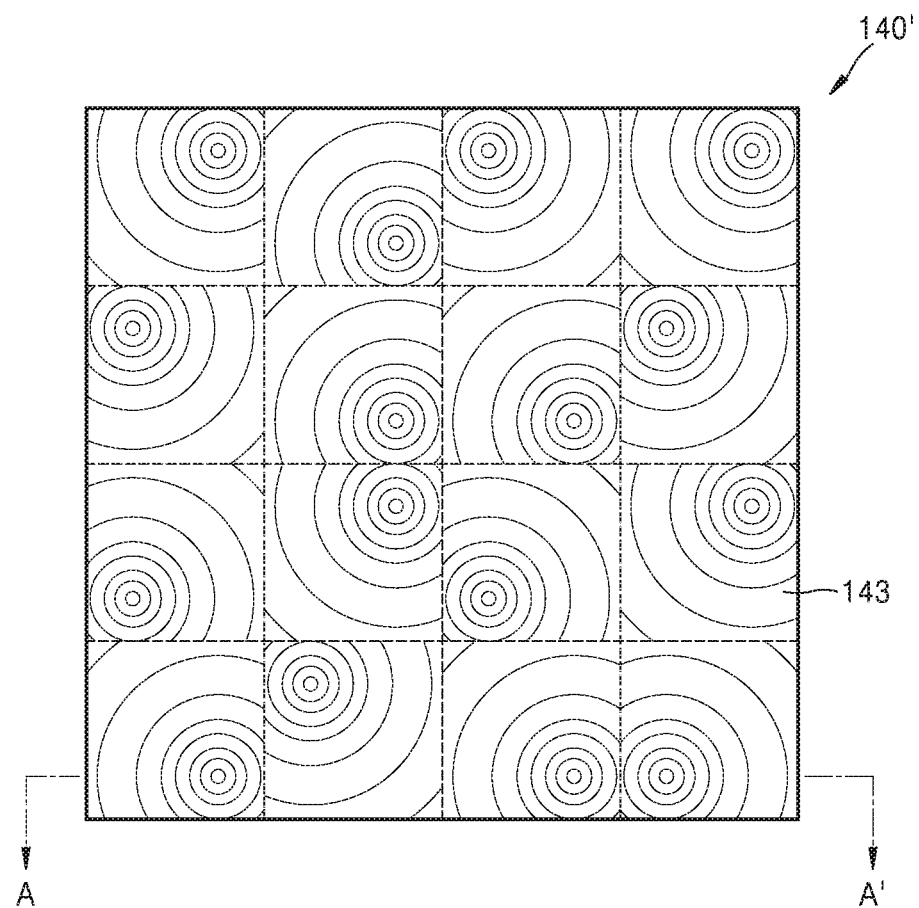
FIG. 13 illustrates an example of a configuration of an optical element according to an example embodiment.
Figure 14:
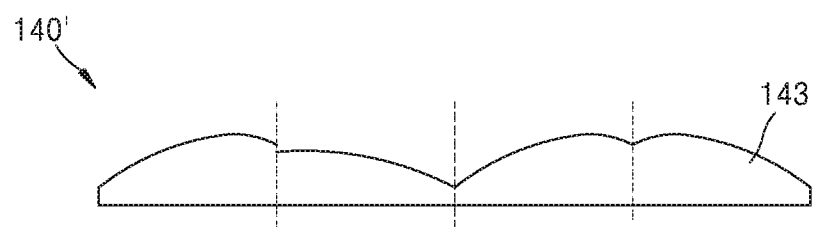
FIG. 14 shows a cross-sectional view of the optical element shown in FIG. 13 along a line A-A'.

The irregular light transmission patterns of the optical element 140 are described as the openings 142 formed through the opaque substrate 141 above. However, in case of using the opaque substrate 141 and the opening 142, because only illumination light is partially transmitted through the opening 142, the light utilization efficiency may be lowered. Thus, instead of the plurality of openings 142, an array of a plurality of micro lenses may be used. For example, FIG. 13 shows an example of a configuration of an optical element 140' according to an example embodiment, and FIG. 14 shows a cross-sectional view of the optical element 140' shown in FIG. 13 along a line A-A'. Referring to FIG. 13, the optical element 140' may include a plurality of micro lenses 143 that are irregularly and two-dimensionally arranged. Here, a plurality of light transmission patterns of the optical element 140' may be the plurality of micro lenses 143.

As shown in FIGS. 13 and 14, the micro lenses 143 of the optical element 140' may be in one to one correspondence with display pixels of the spatial light modulator 130, and the number of the micro lenses 143 may be the same as the number of the display pixels. According to the example embodiment, relative positions between the plurality of display pixels of the spatial light modulator 130 and the plurality of corresponding micro lenses 143 of the optical element 140' may be irregularly set. Each of the micro lens 143 may have a central optical axis. A position of the central optical axis may be irregular and randomly different in each of the micro lenses 143. For example, a relative position between any one display pixel of the spatial light modulator 130 and the central optical axis of one micro lens 143 of the corresponding optical element may be different from relative positions between the other display pixels of the spatial light modulator 130 and the central optical axes of the other micro lenses 143 of the corresponding optical element 140', and a degree of difference may be irregular. As compared to the optical element 140 including the openings 142, the center optical axes of the other micro lenses 143 of the optical element 140' may be identical to the center of the openings 142 of the optical element 140.

Each of the micro lens 143 may be disposed only in a region of the display pixel of the corresponding spatial light modulator 130. Because positions of the center optical axes of the micro lenses 143 corresponding to the display pixels of the spatial light modulator 130 may be different with respect to each display pixel of the spatial light modulator 130, as shown in the cross-sectional view of FIG. 14, boundaries between the two adjacent micro lenses 143 corresponding to different display pixels may be discontinuous.

In addition, descriptions of the optical element 140 including the openings 142 may be most applicable to the optical element 140' including the micro lenses 143. For example, the micro lens 143 may not be disposed in some display pixels of the spatial light modulator 130, and the two micro lenses 143 may be disposed in other display pixels. Although the display pixels of the spatial light modulator 130 and the micro lenses 143 of the optical element 140' are not perfectly in one to one correspondence, the total number of the micro lenses 143 of the optical element 140' may be designed to be the same as or greater than the number of the display pixels of the spatial light modulator 130.

Also, a refractive power of each micro lens 143 may be determined in consideration of the ratio of resolution of a CGH calculated by the image processor 160 to the actual resolution of the spatial light modulator 130. When the micro lens 143 is a flat plate that does not refract light, it may have the same effect as the optical element 140' not being included. The refractive power of the micro lens 143 may inversely correspond to the size of the opening 142 of the optical element 140. The larger the refractive power of the micro lens 143, the smaller the size of a spot formed by the micro lens 143, that is, the larger the refractive power of the micro lens 143, the smaller the size of the opening 142. Also, reducing the refractive power of the micro lens 143 may have the same effect as increasing the size of the opening 142. For example, when the micro lens 143 does not refract light, there may be the effect as that of the size of the opening 142 being the same as the size of the display pixel of the spatial light modulator 130. When the refractive power of the micro lens 143 is selected such that the micro lens 143 reduces an image by half on a focal plane of the focusing optical system 120, it may have almost the same effect as that of the size of the opening 142 being half the size of the display pixel of the spatial light modulator 130. Accordingly, as the ratio of the resolution of the CGH calculated by the image processor 160 to the actual resolution of the spatial light modulator 130 increases, the refractive power of the micro lens 143 may be correspondingly increased.

The holographic display apparatus 100 according to the example embodiment may also include the optical element 140 including the plurality of irregularly arranged openings 142 and the optical element 140' including the plurality of irregularly arranged micro lenses 143. For example, it may be possible to optimize the image quality of a hologram image by combining parameters such as the size of the opening 142 of the optical element 140 and the refractive power of the micro lens 143 of the optical element 140'.

Figure 15:
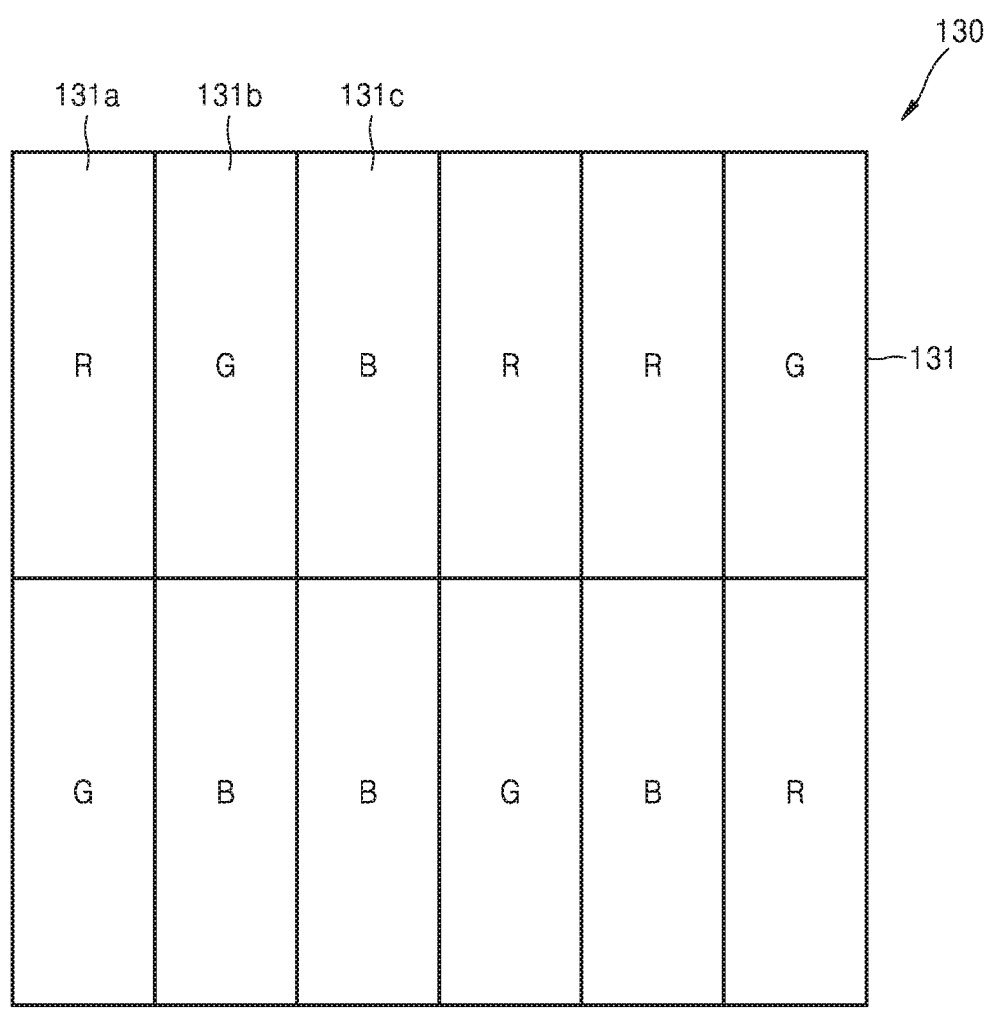
FIG. 15 illustrates an example of a color filter distribution of a color filter array of a spatial light modulator according to an example embodiment.

When the holographic display apparatus 100 provides a color hologram image, the spatial light modulator 130 may be implemented as a color display apparatus having red, green, and blue pixels. To this end, the spatial light modulator 130 may include an array of a plurality of color filters respectively corresponding to display pixels. For example, FIG. 15 illustrates an example of a color filter distribution of a color filter array 131 of the spatial light modulator 130 according to an example embodiment. Referring to FIG. 15, the color filter array 131 may include a plurality of red color filters 131a for transmitting only red wavelength light, a plurality of green color filters 131b for transmitting only green wavelength light, and a plurality of blue color filters 131c for transmitting only blue color light. Each of the red color filters 131a, the green color filters 131b, and the blue color filters 131c may be in one to one correspondence with the display pixels of the spatial light modulator 130.

Further, as shown in FIG. 15, the plurality of red color filters 131a, the plurality of green color filters 131b, and the plurality of blue color filters 131c may be irregularly arranged. The high order noise N1 may be an interference fringe pattern generated by constructive interference and destructive interference of light of the same wavelength. When the red color filters 131a, the green color filters 131b and the blue color filters 131c are regularly arranged, the red color filters 131a may be diffraction lattices with respect to light of a red wavelength, the green color filters 131b may be diffraction lattices with respect to light of a green wavelength, and the blue color filters 131c may be diffraction lattices with respect to light of a blue wavelength. According to the example embodiment, the plurality of red color filters 131a, the plurality of green color filters 131b, and the plurality of blue color filters 131c may be irregularly arranged, thereby preventing or reducing interference of light of the same wavelength.

The number of the red color filters 131a, the green color filters 131b, and the blue color filters 131c in the entire region of the spatial light modulator 130 may be the same. In the spatial light modulator 130, the red color filters 131a, the green color filters 131b, and the blue color filters 131c may be relatively uniformly and irregularly distributed. The image processor 160 may calculate each of red CGH data, the green CGH data, and the blue CGH data in consideration of positions of the red color filters 131a, the green color filters 131b, and the blue color filters 131c respectively.

Figure 16:
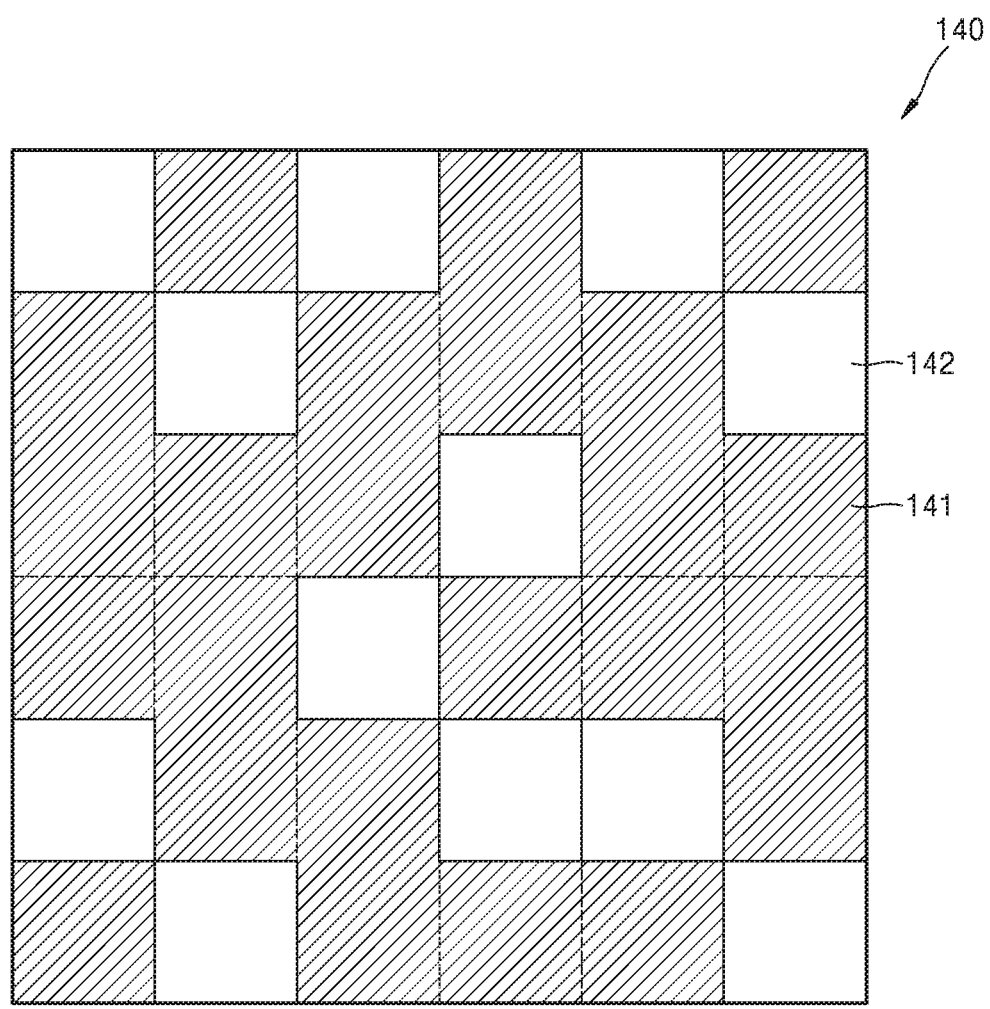
FIG. 16 illustrates an example of a configuration of an optical element according to an example embodiment.

Also, FIG. 16 illustrates an example of a configuration of the optical element 140 according to an example embodiment. Referring to FIG. 16, the plurality of openings 142 of the optical element 140 corresponding to the plurality of red color filters 131a, the green color filters 131b, and the blue color filters 131c, respectively, may be irregularly arranged. Rectangular lattices indicated in dotted lines in FIG. 16 correspond to one display pixel of the spatial light modulator 130 or one color filter. In FIG. 16, a size of each opening 142 is approximately ⅓ of a size of one display pixel of the spatial light modulator 130, but is not limited thereto.

The plurality of openings 142 of the optical element 140 may be irregularly arranged with respect to the entire display pixels of the spatial light modulator 130 and irregularly arranged with respect to each color filter. For example, relative positions between the plurality of red color filters 131a and the plurality of respectively corresponding openings 142 may be irregularly set, relative positions between the plurality of green color filters 131b and the plurality of respectively corresponding openings 142 may be irregularly set, and relative positions between the plurality of blue color filters 131c and the plurality of respectively corresponding openings 142 may be irregularly set.

In FIG. 16, light transmission patterns of the optical element 140 respectively corresponding to the plurality of color filters of the spatial light modulator 130 may be the openings 142, but the micro lenses 143 may be used instead of the openings 142.

Figure 17:
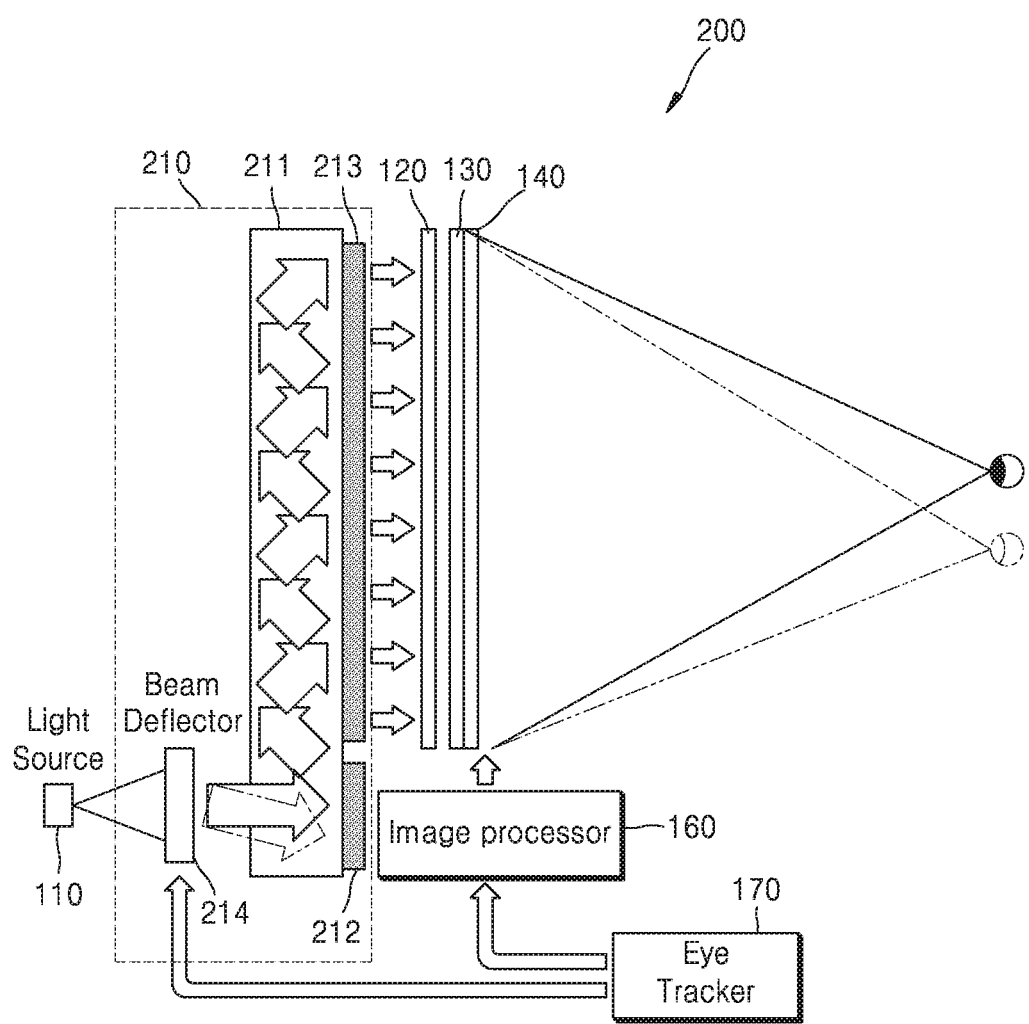
FIG. 17 is a schematic diagram showing a configuration of a holographic display apparatus according to an example embodiment.

FIG. 17 is a schematic diagram showing a configuration of a holographic display apparatus 200 according to an example embodiment. Referring to FIG. 17, the holographic display apparatus 200 according to an example embodiment may include the light source 110 for providing light, the spatial light modulator 130 for forming a hologram pattern for modulating incident light to reproduce a hologram image, the focusing optical system 120 for focusing the hologram image on a space, the optical element 140 for expanding a viewing window, the image processor 160 for generating a hologram signal according to the hologram image to be reproduced and providing the hologram signal to the spatial light modulator 130, an illumination optical system 210 for transmitting the light emitted from the light source 110 to the spatial light modulator 130 and the eye tracker 170 for tracking a pupil position of an observer.

The holographic display apparatus 200 according to the example embodiment may provide a hologram image for the left eye and a hologram image for the right eye as one light source 110 by using the illumination optical system 210. The illumination optical system 210 may be configured to divide the light incident from the light source 110 and emit the divided light to travel in a left eye direction and a right eye direction. For example, the illumination optical system 210 may include a transparent light guide plate 211 including an input coupler 212 and an output coupler 213, and a beam deflector 214 for providing the light emitted from the light source 110 to the input coupler 212.

The beam deflector 214 may be a liquid crystal deflector that diffracts incident light to produce two light beams traveling at different angles. The two light beams may be incident on the input coupler 212 at different angles and travel at different angles within the light guide plate 211. As a result, exit angles of the two light beams emitted through the output coupler 213 may also be different from each other. The two light beams from the output coupler 213 may transmit through the focusing optical system 120, the spatial light modulator 130, and the optical element 140 and then finally travel toward the left and right eyes of the observer respectively. The beam deflector 214 may also adjust incidence angles of the two light beams incident on the input coupler 212 in response to pupil position information of the observer provided from the eye tracker 170.

In FIG. 17, the focusing optical system 120, the spatial light modulator 130, and the optical element 140 are sequentially arranged along the traveling direction of the light beam from the output coupler 213. However, this is merely an example. An arrangement order of the focusing optical system 120, the spatial light modulator 130, and the optical element 140 may be selected differently. The optical element 140 may include an array of a plurality of irregularly and randomly arranged light transmission patterns to expand a viewing window of the holographic display apparatus 200 and reduce high order noise.

While the holographic display apparatuses and methods for providing an expanded viewing window have been shown and described with reference to the example embodiments illustrated in the drawings, it will be understood by those of ordinary skill in the art that various changes in form and details may be made therein without departing from the spirit and scope as defined by the following claims It should be understood that embodiments described herein should be considered in a descriptive sense only and not for purposes of limitation. Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. A holographic display apparatus comprising:
   a light source configured to emit light;
   a spatial light modulator configured to form a hologram pattern to modulate the light incident thereon and reproduce a hologram image, the spatial light modulator comprising a plurality of display pixels that are arranged two-dimensionally;
   an optical element provided opposite a light incidence surface of the spatial light modulator or a light exit surface of the spatial light modulator, the optical element comprising an array of a plurality of light transmission patterns, the plurality of light transmission patterns being arranged irregularly;
   an image processor configured to:
     generate hologram data based on the hologram image to be reproduced at a resolution corresponding to a resolution of the array of the plurality of light transmission patterns, extract hologram data that correspond to positions of the plurality of light transmission patterns among the generated hologram data, and provide the extracted hologram data to the spatial light modulator.

2. The holographic display apparatus of claim 1, wherein the resolution of the array of the plurality of light transmission patterns is greater than a resolution of the spatial light modulator.

3. The holographic display apparatus of claim 1, wherein the plurality of display pixels of the spatial light modulator correspond to the plurality of light transmission patterns, respectively, and wherein each of the plurality of display pixels is configured to display the hologram pattern based on the position of each of the plurality of light transmission patterns corresponding thereto.

4. The holographic display apparatus of claim 1, wherein the plurality of light transmission patterns of the optical element comprise a plurality of openings that are irregularly arranged on an opaque substrate.

5. The holographic display apparatus of claim 4, wherein a size of each of the plurality of openings is less than a size of each of the plurality of display pixels of the spatial light modulator.

6. The holographic display apparatus of claim 5, wherein one or more openings of the plurality of openings correspond to each of the plurality of display pixels of the spatial light modulator.

7. The holographic display apparatus of claim 6, wherein each of the plurality of openings corresponds to each of the display pixels of the spatial light modulator.

8. The holographic display apparatus of claim 5, wherein at least one of the plurality of display pixels of the spatial light modulator do not correspond to an opening among the plurality of openings.

9. The holographic display apparatus of claim 5, wherein relative positions between the plurality of display pixels of the spatial light modulator and the plurality of openings of the optical element respectively corresponding thereto are irregular.

10. The holographic display apparatus of claim 9, wherein a relative position between a first display pixel of the spatial light modulator and a first opening of the optical element corresponding thereto is different from a relative position between a second display pixel of the spatial light modulator and a second opening of the optical element corresponding thereto.

11. The holographic display apparatus of claim 4, wherein a number of the plurality of openings of the optical element is equal to or greater than a number of the plurality of display pixels of the spatial light modulator.

12. The holographic display apparatus of claim 11, wherein the number of the plurality of openings of the optical element is equal to the number of the plurality of display pixels of the spatial light modulator.

13. The holographic display apparatus of claim 1, wherein the plurality of light transmission patterns of the optical element comprise a plurality of micro lenses arranged irregularly and two-dimensionally.

14. The holographic display apparatus of claim 13, wherein a number of the plurality of micro lenses of the optical element is equal to or greater than a number of the plurality of display pixels of the spatial light modulator.

15. The holographic display apparatus of claim 14, wherein the number of the plurality of micro lenses of the optical element is equal to the number of the plurality of display pixels of the spatial light modulator.

16. The holographic display apparatus of claim 13, wherein one or more micro lenses among the plurality of micro lenses correspond to each of the plurality of display pixels of the spatial light modulator.

17. The holographic display apparatus of claim 16, wherein each of the one or more micro lens corresponds to each of the plurality of display pixels of the spatial light modulator.

18. The holographic display apparatus of claim 13, wherein at least one of the plurality of display pixels of the spatial light modulator do not correspond to a micro lens among the plurality of micro lenses.

19. The holographic display apparatus of claim 13, wherein relative positions between the plurality of display pixels of the spatial light modulator and centers of the plurality of micro lenses of the optical element respectively corresponding thereto are irregular.

20. The holographic display apparatus of claim 19, wherein a relative position between a first display pixel of the spatial light modulator and a center of a first micro lens of the optical element corresponding thereto is different from a relative position between a second display pixel of the spatial light modulator and a center of a second micro lens of the optical element corresponding thereto.

21. The holographic display apparatus of claim 1, wherein the spatial light modulator further comprises a color filter array that comprises:

a plurality of first color filters configured to transmit only light of a first wavelength;

a plurality of second color filters configured to transmit only light of a second wavelength that is different from the first wavelength; and a plurality of third color filters configured to transmit only light of a third wavelength that is different from the first wavelength and the second wavelength.

22. The holographic display apparatus of claim 21, wherein the plurality of first color filters, the plurality of second color filters, and the plurality of third color filters are irregularly provided in the color filter array.

23. The holographic display apparatus of claim 22, wherein relative positions between the plurality of first color filters of the spatial light modulator and the plurality of light transmission patterns of the optical element respectively corresponding thereto are irregular, wherein relative positions between the plurality of second color filters of the spatial light modulator and the plurality of light transmission patterns of the optical element respectively corresponding thereto are irregular, and wherein relative positions between the plurality of third color filters of the spatial light modulator and the plurality of light transmission patterns of the optical element respectively corresponding thereto are irregular.

24. The holographic display apparatus of claim 1, wherein the optical element further comprises:

a first optical element comprising a plurality of openings arranged irregularly in an opaque substrate; and a second optical element comprising a plurality of micro lenses arranged irregularly and two-dimensionally.

25. The holographic display apparatus of claim 1, further comprising:

an eye tracker configured to track a pupil position of an observer.

26. The holographic display apparatus of claim 25, wherein the light source comprises:
- a first light source configured to emit light to form a first hologram image with a first viewing point; and
- a second light source configured to emit light to form a second hologram image with a second viewing point different from the first viewing point.

27. The holographic display apparatus of claim 26, further comprising:
- an actuator configured to adjust positions of the first light source and the second light source based on the pupil position of the observer provided from the eye tracker.

28. The holographic display apparatus of claim 25, further comprising:
- an illumination optical system configured to transmit the light emitted from the light source to the spatial light modulator.

29. The holographic display apparatus of claim 28, wherein the illumination optical system comprises a light guide plate that comprises an input coupler, an output coupler, and a beam deflector configured to provide the light emitted from the light source to the input coupler, and
wherein the beam deflector is further configured to adjust an incidence angle of the light incident on the input coupler based on to pupil position information of the observer provided from the eye tracker.

30. A display method performed by a holographic display apparatus comprising a spatial light modulator configured to form a hologram pattern to modulate an incident light and reproduce a hologram image and comprising a plurality of display pixels that are arranged two-dimensionally, and an optical element provided opposite to a light incidence surface of the spatial light modulator or a light exit surface of the spatial light modulator and comprising an array of a plurality of light transmission patterns, the plurality of light transmission patterns being arranged irregularly, the display method comprising:
- calculating a computer generated hologram (CGH) having a resolution greater than an actual resolution of the spatial light modulator;
- sampling the calculated CGH based on positions of the plurality of light transmission patterns of the optical element such that CGH data that correspond to positions of the plurality of light transmission patterns are extracted among the calculated CGH; and
- forming, by the spatial light modulator, the hologram pattern based on the sampled CGH data.

31. The display method of claim 30, wherein the plurality of light transmission patterns of the optical element comprises a plurality of openings that are arranged irregularly in an opaque substrate.

32. The display method of claim 31, wherein a size of each of the plurality of openings is less than a size of each of the plurality of display pixels of the spatial light modulator.

33. The display method of claim 32, wherein a ratio of the resolution of the calculated CGH to the actual resolution of the spatial light modulator is equal to a ratio of an area of each of the plurality of display pixels to an area of each of the plurality of openings.

34. The display method of claim 32, wherein a ratio of the resolution of the calculated CGH to the actual resolution of the spatial light modulator is equal to a ratio of an entire area of the plurality of display pixels to an entire area of the plurality of openings.

35. The display method of claim 32, wherein relative positions between the plurality of display pixels of the spatial light modulator and the plurality of openings of the optical element respectively corresponding thereto are irregular.

36. The display method of claim 30, wherein the plurality of light transmission patterns of the optical element comprises a plurality of micro lenses that are arranged irregularly and two-dimensionally.

37. The display method of claim 36, wherein relative positions between the plurality of display pixels of the spatial light modulator and centers of the plurality of micro lenses of the optical element respectively corresponding thereto are irregular.

38. The display method of claim 36, wherein a ratio of the resolution of the calculated CGH to the actual resolution of the spatial light modulator corresponds to a refractive power of each of the plurality of micro lenses.

39. A holographic display apparatus comprising:
- a light source configured to emit light;
- a spatial light modulator configured to form a hologram pattern to modulate the light incident thereon and reproduce a hologram image, the spatial light modulator comprising a plurality of display pixels that are provided two-dimensionally; and
- an optical element comprising a plurality of light transmission patterns that are comprise a plurality of openings that are irregularly provided on an opaque substrate,
wherein the plurality of display pixels of the spatial light modulator corresponds to the plurality of light transmission patterns, respectively, and
wherein a size of each of the plurality of openings being less than a size of each of the plurality of display pixels of the spatial light modulator.

* * * * *